(12) United States Patent
Dudko et al.

(10) Patent No.: US 6,561,722 B1
(45) Date of Patent: May 13, 2003

(54) METHOD OF FABRICATING STRUCTURAL JOINTS

(75) Inventors: Danylo Dudko, Providence, RI (US); Viacheslav Shevchenko, Providence, RI (US); Ludmilla Kistersky, Providence, RI (US); Thomas A. Barber, Pawtucket, RI (US); Robert L. Benoit, Oakdale, NY (US); Bernard I. Rachowitz, Lloyd Neck, NY (US); Glenn L. Spacht, Lloyd Neck, NY (US); Anthony Mascolo, Islip Terrace, NY (US)

(73) Assignees: Fuel Cell Components and Integrators, Inc., Hauppauge, NY (US); Inli, LLC, Providence, RI (US); Tabco Technologies, Inc., Pawtucket, RI (US)

( * ) Notice: Subject to any disclaimer, the term of this patent is extended or adjusted under 35 U.S.C. 154(b) by 0 days.

(21) Appl. No.: 09/964,023

(22) Filed: Sep. 25, 2001

Related U.S. Application Data

(63) Continuation of application No. 09/484,112, filed on Jan. 14, 2000.

(51) Int. Cl.$^7$ ................................................ B23P 11/00
(52) U.S. Cl. ........................ 403/282; 29/419.2; 29/518
(58) Field of Search ............................... 403/267, 269, 403/282, 279, 272; 285/382; 72/56; 29/419.2, 518

(56) References Cited

U.S. PATENT DOCUMENTS

| | | | | |
|---|---|---|---|---|
| 3,528,596 A | * | 9/1970 | Carlson | 72/56 |
| 4,523,872 A | * | 6/1985 | Arena et al. | 403/274 |
| 4,807,351 A | * | 2/1989 | Berg et al. | 29/432 |
| 5,163,714 A | * | 11/1992 | Issenmann | 285/54 |
| 5,813,264 A | * | 9/1998 | Steingroever | 72/56 |

* cited by examiner

Primary Examiner—Lynne H. Browne
Assistant Examiner—David E. Bochna
(74) Attorney, Agent, or Firm—Salzman & Levy

(57) ABSTRACT

A load bearing structural joint that is fabricated using an electromagnetic process, features a tube that is joined to a fitting of another component. Lightweight materials and thicknesses can be used, because the welding is performed without the adverse effects of annealing or heat. The fabricated structure has an improved strength to weight ratio, and prolonged fatigue life.

14 Claims, 6 Drawing Sheets

METHOD OF FABRICATING STRUCTURAL JOINTS

RELATED PATENT APPLICATION

This application is a continuation of copending U.S. patent application Ser. No. 09/484,112, filed Jan. 14, 2000.

FIELD OF THE INVENTION

The present invention relates to methods of fabricating structural members and, more particularly, to a technique for joining load bearing, thin walled, tubular members so that they possess improved strength and rigidity.

BACKGROUND OF THE INVENTION

Many products are constructed from tubing members, because a thin walled tube is structurally efficient. Products comprising thin walled tubes have reduced material content and therefore lower weight and cost.

Historically, tubular structures were fabricated by joining tubes to other tubes and end fittings by means of welding. This practice, however, does not provide efficient products because, when the tubular material is welded at its ends, yield strength in the area of the weld is reduced as a result of the local annealing. To increase the diminished strength, the tubular product must then be thickened, thus increasing its material and weight. The increase in material and weight defeats the very purpose of using the thin walled construction in the first place.

Adhesive bonding has been used for certain thin walled tubular applications in order to obtain a weight advantage. However, adhesively bonded joints are not as strong as welded joints or as the material of the tube.

The load bearing joints have been created by a process known as electromagnetic forming (EMF). EMF has been successfully employed to swage electrically conductive tubing onto fittings. The swaging is accomplished by an electromagnetic-induced force. For those applications in which the joint must resist torque, a groove pattern with axes parallel to the centerline of the tube is required. In order to minimize the stress on the joint, the length of joint and fitting may produce a fitting weight which is greater than desired.

A process described in U.S. Pat. No. 3,520,049 to Lysenko.et al, which is referred to as Magnetic Pulse Welding (MPW), is similar to the EMF process. MPW uses magnetic fields induced by high electrical currents to join tubular material to fittings. In the case of MPW, higher forces are generated and the tubular material and fitting are welded together. A torque carrying the MPW joint is shorter and therefore lighter than an equivalent performance EMF joint.

In the MPW process, precise positioning of the structural components is required to produce a consistent weld. A loose fit between the fitting and the tube, as described in U.S. Pat. No. 5,981,921, issued to Yablochnikov on Nov. 9, 1999, requires accurate tooling to support the individual components being welded. YABLOCHNIKOV describes a method for securing components of a vehicular driveshaft. A neck of an end fitting is disposed into the open end of a driveshaft tube. The end fitting is held with respect to the tube so that an annular gap is formed between the neck and the tube. An inductor, disposed about the tube, is energized to generate a magnetic field for collapsing the tube about the neck at a high velocity so that the tube and the end fitting are welded to each other.

The current invention precisely aligns and positions the tube and fitting relative to each other, without external holding fixtures. This precise alignment ensures a high quality weld.

The present invention relates to a method of fabricating structures with load carrying joints by the attachment of tubular components to fittings. A load carrying joint is a joint which carries torsion, bending or tension either individually or in combination. Examples incorporating load bearing joints are: 1) a bicycle frame or wheelchair, 2) the joints in an automobile frame, 3) joints between the end fittings and tubular sections of aircraft torque tubes and push rods, 4) the joint between a golf club shaft and club head, 5) the joint between the end fittings and tubular sections of automotive drive shafts and half shafts, etc.

SUMMARY OF THE INVENTION

This invention relates to the fabrication of load bearing joints that are formed from a tubular component and a self-aligning and locating fitting. The resultant joint is capable of handling torque, bending, tension, or a combination of these loads. The method of the invention utilizes a large electrical current to induce a magnetic field that causes the components to be welded to one another, without subjecting the components to the heat associated with conventional welding. Accordingly, the structural joint includes an outer tubular component with an open end. The open end receives an inner, cylindrically shaped member of a fitting. The cylindrically shaped member has a circumferential protuberance that is larger in diameter than the inside diameter of the outer tubular component. This feature acts as a tube stop. The fitting also incorporates an annular locating ring which provides an interference fit with the inside diameter of the outer tubular component. The annular locating ring incorporates a lead chamfer to guide the fitting as it is thrust into the open end of the outer tubular component.

Energizing an inductor positioned around the outer tube at a longitudinal location between the annular locating ring and the tube stop generates a magnetic field that welds the components (i.e., the tube and the fitting) to each other. The corner of the annular locating ring adjacent the tube, closest to the tube stop, is radially shaped. This radial shape reduces local stresses imposed upon the tube during the welding process. This stress relief prevents cracking and improves the fatigue life of the assembly.

It is an object of this invention to provide an improved tubular load bearing joint.

It is another object of the invention to provide a tubular load bearing joint that has improved fatigue life.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like components and elements will bear the same designation and numbering throughout the figures.

DESCRIPTION OF THE PREFERRED EMBODIMENT

Generally speaking, the invention features a load bearing structural joint that is fabricated using an electromagnetic process. The joint comprises a tube that is joined to a fitting which may be attached to another tube. Lightweight materials and thicknesses can be used, because the welding is performed without the adverse effects of annealing or heat. The fabricated structure has an improved strength to weight ratio and prolonged fatigue life.

Figure 1:
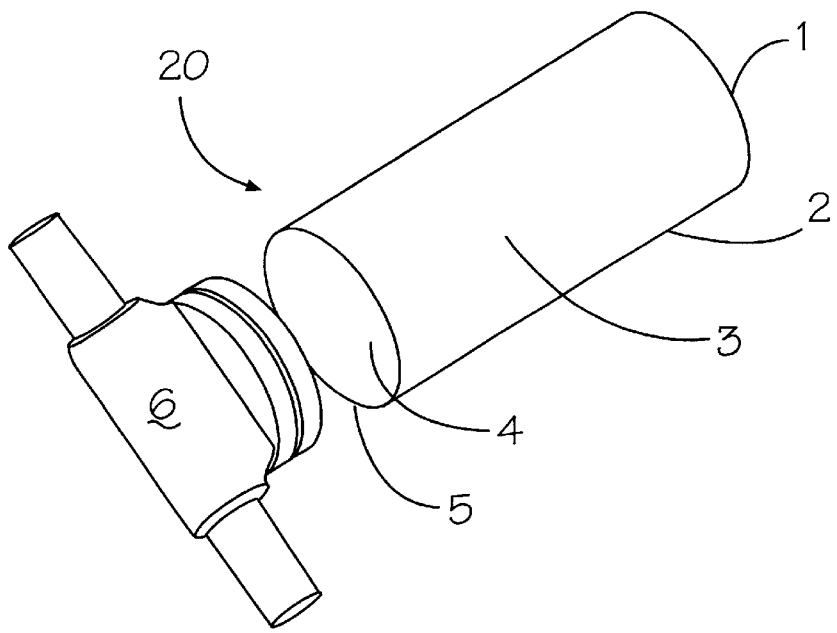
FIG. 1 illustrates a perspective, exploded view of a tube and fitting to be welded together, in accordance with the invention.

Now referring to FIG. 1, the structural joint 20 of this invention is illustrated here in exploded view. The structural joint 20 comprises selected parts of a typical joining of a tubular component 2 to a fitting 6. The tubular member 2 can comprise a predetermined length of tube. The tube 2 is a hollow member with at least one open end, illustrated at position 5. The tube 2 is illustrated with a second open end, as depicted at position 1. However, in other embodiments, the tube 2 can include another member secured to the open end 1.

Preferably, the tube 2 has a substantially constant inner diameter defined by an inner wall surface 4 and a substantially constant outer diameter defined by the outer wall surface 3, as shown in FIG. 1, representing a tube of uniform thickness. The tube 2 can be formed of any suitable electrically conductive material, such as aluminum alloy.

Figure 2:
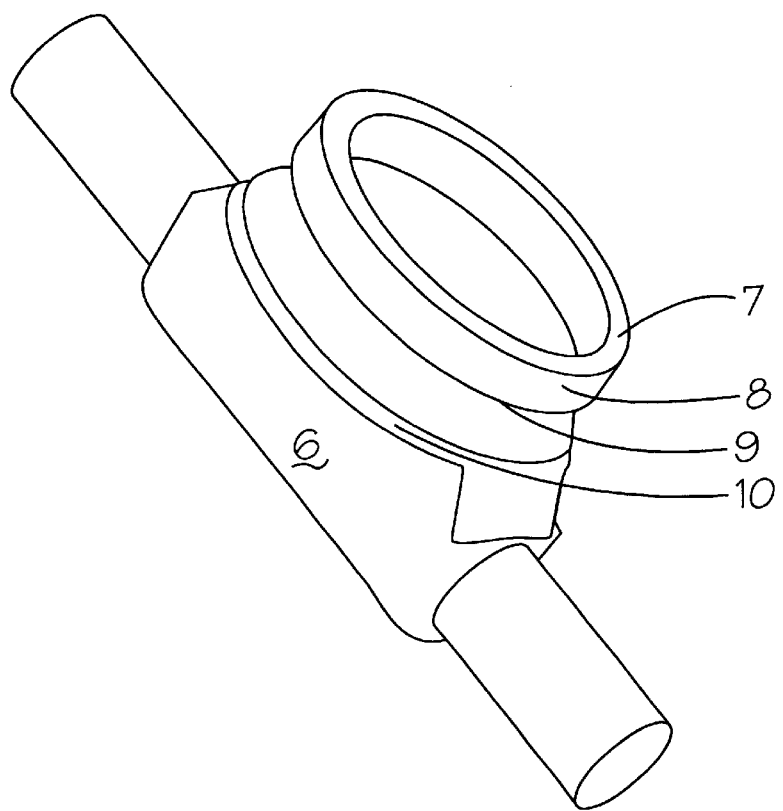
FIG. 2 depicts a perspective view of the fitting illustrated in FIG. 1.
Figure 3:
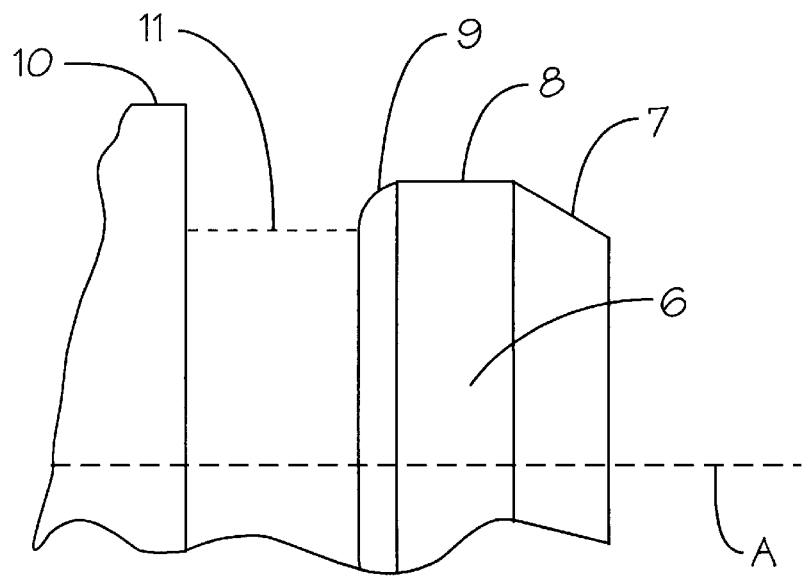
FIG. 3 shows a partial, enlarged, side view of the fitting depicted in FIGS. 1 and 2.
Figure 4:
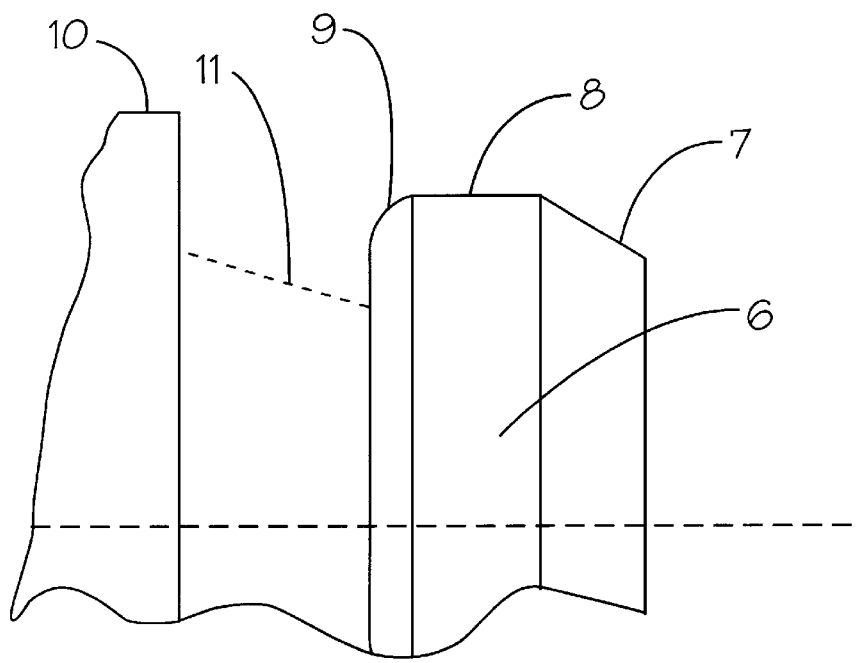
FIG. 4 illustrates a partial, enlarged, side view of a second embodiment of the fitting depicted in FIG. 3.
Figure 5:
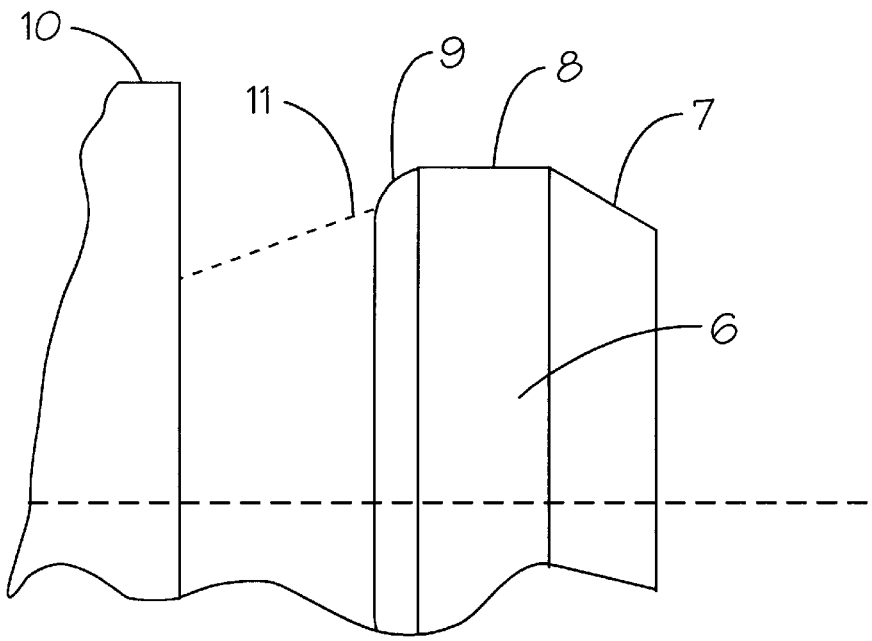
FIG. 5 depicts a partial, enlarged, side view of a third embodiment of the fitting shown in FIG. 3.

Referring to FIG. 2, the fitting 6 is shown with an abutment surface 10 that presents a stop for tube 2. An annular locating ring 8, incorporating a lead chamfer 7 and a stress relieving radius 9, is provided and can be better observed with reference to the enlarged, side view, shown in FIG. 3. The fitting 6 incorporates a landing surface 11 located between the annular locating ring 8 and the fitting abutment 10. The landing surface 11 may be parallel to the centerline A of the fitting 6, as shown in FIG. 3, or it may be tapered, as depicted in the embodiments illustrated in FIGS. 4 and 5.

Figure 6:
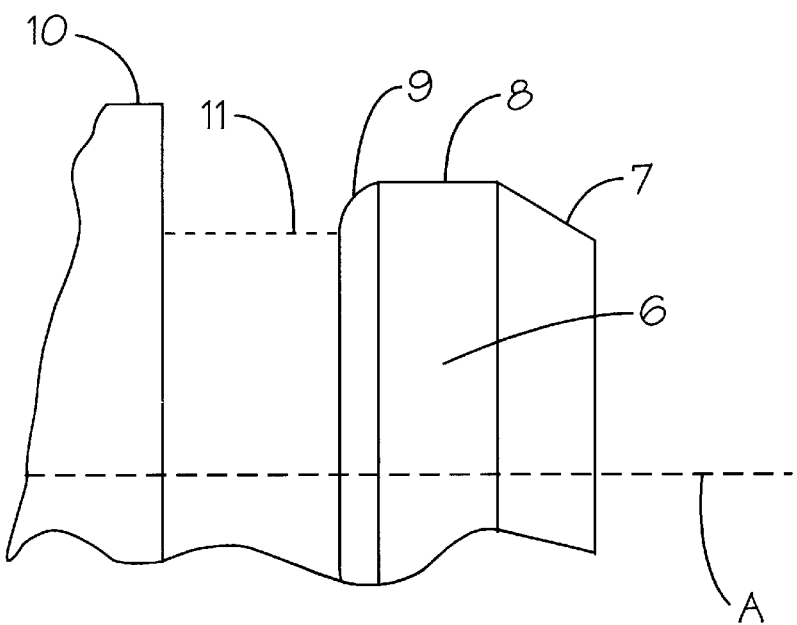
FIG. 6 shows a partial, enlarged, side view of a fourth embodiment of the fitting depicted in FIG. 3.

The stress relieving radius 9 may intersect with the landing surface 11, as shown in the embodiment in FIG. 6. The fitting 6 may be a feature of parts designed for specific applications such as aircraft torque tubes, automotive drive shafts, bicycle frame lugs, etc.

Figure 7:
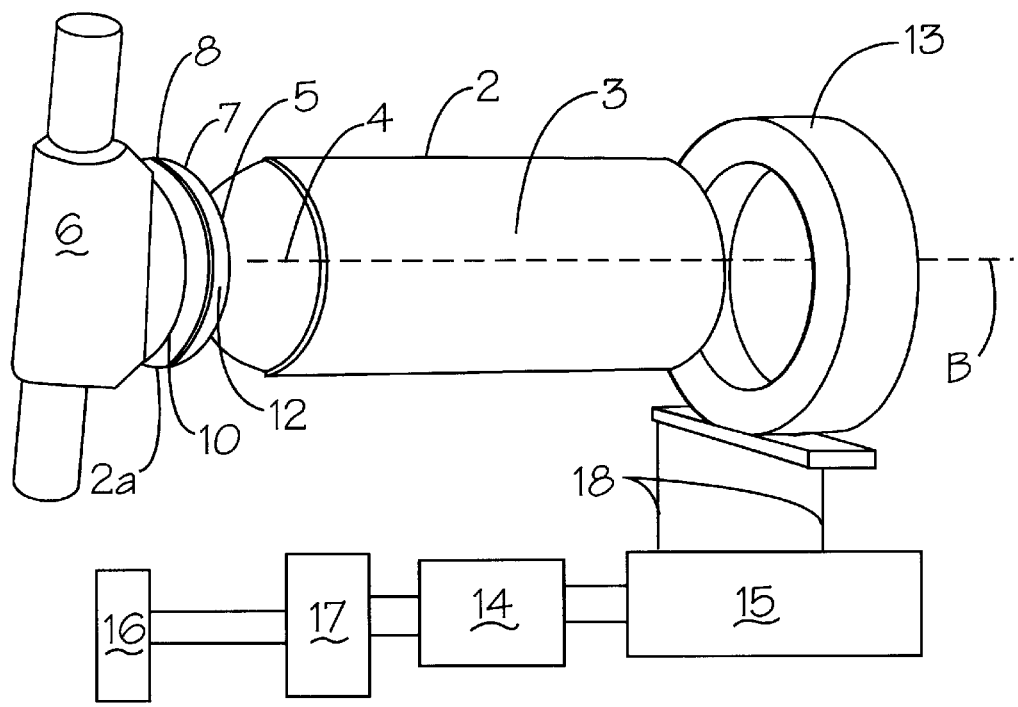
FIG. 7 illustrates, in a perspective and schematic hybrid view, the apparatus and circuit for electro-magnetically welding the tube and fitting depicted in FIG. 1.

Referring to FIG. 7, a hybrid view of the apparatus and circuitry for welding the tube 2 to the fitting 6 is shown. The annular locating ring 8 on the cylindrical neck of the fitting 6 is sized so that an interference fit occurs between the outer wall surface 12 and the inner surface 4 of the tube 2, when the neck of the fitting 6 is inserted into the tube 2. In fact, the interference fit actually slightly deforms tube 2 at point 2a, as the neck of the fitting 6 is inserted therein. The lead chamfer 7 on the cylindrical neck of the fitting 6 aligns the centerline B of the tube 2 with the centerline A of the fitting 6, prior to inserting the cylindrical neck of the fitting 6 into the tube 2.

The end 5 of the tube 2 is orthogonally trimmed to the centerline B of the tube 2, in order to place the tube 2 in full contact with the lead chamfer 7. The abutment 10, which is orthogonal to the centerline A of the cylindrical portion of the fitting 6, precisely locates the depth of insertion of the fitting 6 into the tube 2 when the end 5 of the tube 2 is in full contact with the abutment 10. The abutment 10 acts as a stop for the tube 2, and assists the annular locating ring 8 in aligning the centerline B of the tube 2 with the centerline A of the fitting 6.

An inductor coil 13 is provided about the outer surface 3 of the tube 2. The inductor coil 13 may be in the form of a single-turn or multi-turn coil. Inductor coil 13 includes leads or terminals 18 to connect it to a number of high voltage capacitors 14, via a discharge circuit 15. The number of capacitors 14 required is a function of the diameter, wall thickness, and material properties of the tube 2 and the material properties of the fitting 6. The battery of capacitors 14 is attached to a source of electrical power 16 through a charging circuit 17.

The welding process is initiated by charging the capacitors 14 via the charging circuit 17. The discharge control circuit 15 discharges the capacitors 14 through the inductor 13, creating an intense momentary magnetic field, when a user selected charge level is reached. The effect of the field on the metallic tube 2 is to create an extremely powerful force which drives the tube 2 radially inward, away from the inductor coil 13, at a high velocity until it impacts the landing surface 11 of fitting 6 with sufficient force to weld the two components to each other.

EXAMPLE

Figure 8:
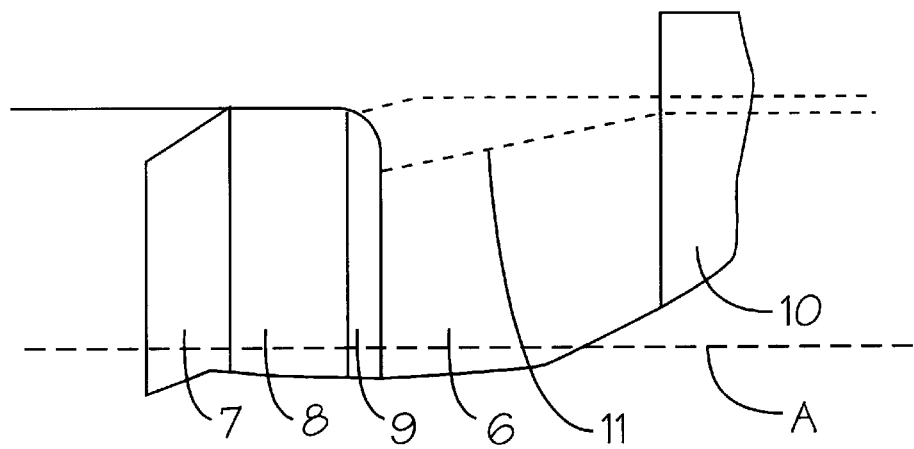
FIG. 8 depicts a side view of the fitting used in a sample joining of the joint structure of this invention.

Referring to FIG. 8, an example of a successful application of the inventive process is illustrated. In this example, a 6061 aluminum alloy tube (not shown) is joined to a mild steel end fitting 6. The aluminum tube has an outside diameter of 88.9 mm (tolerance of +0.1 mm), and wall thickness of 2.2 mm (tolerance of ±0.1 mm). The tube is pressed onto the steel fitting 6. The steel fitting 6 has an annular locating ring 8, whose diameter is 84.5 mm (tolerance of +0.1 mm). The distance between the tube abutment 10 and the annular locating ring 8 comprises the 12 mm landing surface 11, with a tolerance of ±0.3 mm), and a slope of seven degrees (tolerance of ±0.5 degrees), as shown.

Upon insertion of the fitting into the tube, and prior to welding, the minimum distance between the inner surface of the tube and the landing surface 11 is between zero and 0.5 mm. The lead chamfer 7 on fitting 6 is 2 mm long and forms a 30 degree angle with the axis of revolution of fitting 6.

The welding is performed first by inserting the assembled tube and fitting 6 into the inductor coil 13, and locating the assembly so as to place the working zone of the inductor coil 13 adjacent to the portion of the tube between the annular locating ring 8 and the tube abutment 10. Twelve capacitors 14, each with a capacitance of twelve microfarads, are charged from a 220 volt power source by means of a charging circuit 17 incorporating a transformer. The total capacitance is 144 microfarads, since the capacitors are wired in parallel. Upon attaining a total charge of 16,800 volts, the capacitors 14 are discharged through the inductor coil 13 by the discharge circuit 15, resulting in a very short impulse current of about 500,000 amps. The current creates a magnetic field around the inductor coil 13, which induces an electrical eddy current and a resulting magnetic field on the tube. As a result of the interaction of the magnetic fields of the inductor current and the eddy current in the tube, the tube is rapidly compressed, striking fitting 6 on the landing surface 11 with a force sufficient to produce a metallurgical joint between the tube and the fitting, wherein the molecules of the metals actually meld together.

It is helpful to understand the dynamics of the welding operation of the inventive method and structure, especially when compared to those of the prior art system disclosed in the aforementioned U.S. Pat. No. 5,981,921, issued to YABLOCHNIKOV. FIG. 12 of that reference is redrawn herein, the original reference numerals all being appended with a "prime" (single apostrophe) in order to distinguish the YABLOCHNIKOV reference numerals from those of the present invention. The position of YABLOCHNIKOV driveshaft tube 12' at the start of pulse welding is the same as the completion of pulse welding. When the tube 12' impacts the fitting 96', it does so in a somewhat tangential fashion, creating a weld that occurs simultaneously along the sloped surface 106', thus minimizing the amount of interaction of the two contacting surfaces 106' and 12'. Accordingly, there is relatively little molecular interaction between the fitting 96' and the tube 12', providing a weld that is not relatively deep or substantial.

Also, surface impurities are prevented from traveling during the YABLOCHNIKOV welding process, as is discussed hereinbelow. This reduces or eliminates self cleaning. The weld proceeds away from the crest 102', toward the tube stop 14'. Accordingly, the weld itself is less than optimum since the cleaner the surfaces prior to and during welding, the better the resulting, final weld.

Figure 9:
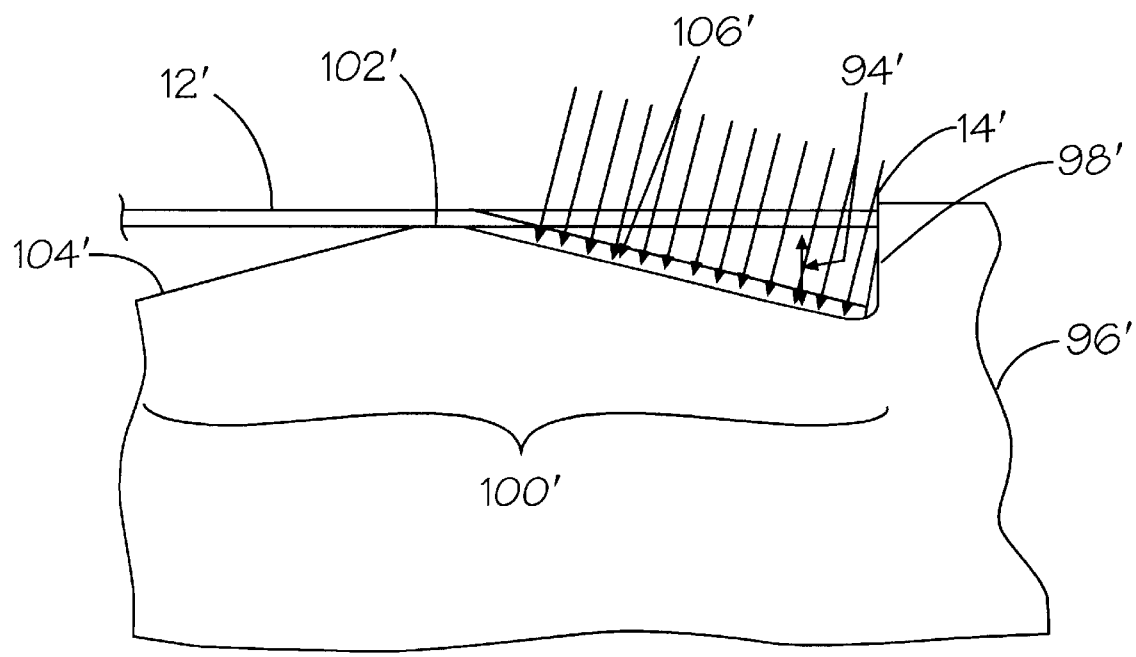
FIG. 9 is a side view of a prior art fitting, showing lines of force that develop during the welding operation.
Figure 10:
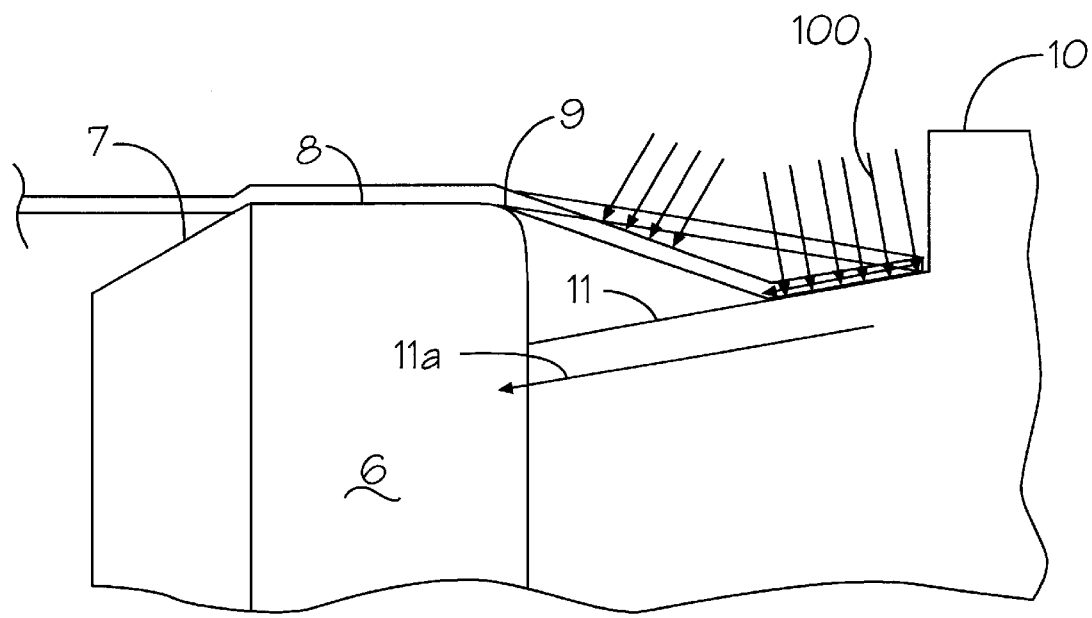
FIG. 10 is a side view of the inventive fitting, showing lines of force that develop during the welding operation and the direction of sequential magnetic pulse welding that occurs during assembly.
Figure 11:
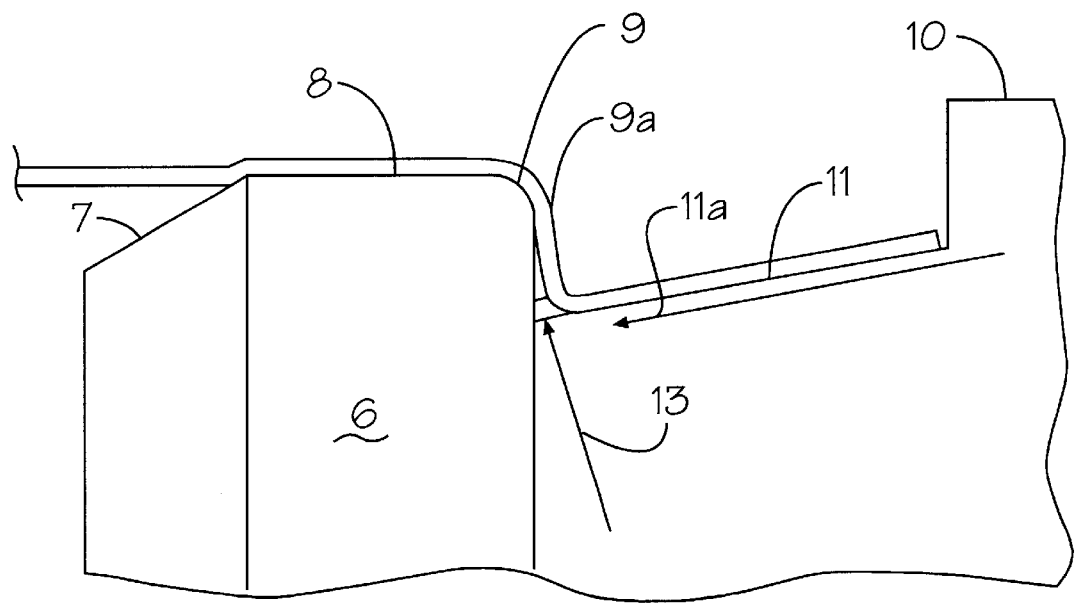
FIG. 11 depicts a side view of the two components that are welded, a portion of the surface being bent upwardly and forming a pocket to retain impurities.

Referring now to FIGS. 10 and 11, there are shown a before-weld and after-weld side view of the inventive apparatus, respectively, oriented as the prior art apparatus depicted in FIG. 9. An angular or conical surface 11 exists, but the surface 11 slopes in a direction opposite to that shown above with respect to the YABLOCHNIKOV reference. Due to the opposite slope of surface 11 after the tube 2 contacts the fitting 6, the weld travels sequentially down the slope (arrow 11a) toward a pocket 13 created by the vertical surface 9a adjacent to the stress relieving radius 9 and sloped surface 11. Since it is impossible for the tube 2 to completely fill the pocket 13 after welding, the pocket 13 forms an area for the surface impurities to collect. The self-cleaning action is due to the slope of surface 11 that creates a wedging action and an interaction between the tube 2 and the sloped surface 11.

The weld between tube 2 and fitting 6 occurs sequentially, as aforementioned, along the surface 11 shown in the direction of arrow 11a, rather than simultaneously. Thus, the weld penetrates the surface 11 to a greater depth because the impact area on the slope surface 11 is small at any instant, yet the kinetic energy is high, creating significant pressures at a non-perpendicular angle to surface 11, along the interface between the tube 2 and sloped surface 11. Moreover, the forces that interact in a tangential fashion (force lines 100) to the surface 11 create a scrubbing or cleaning action with the impurities migrating toward the pocket 13 as the welding occurs.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of joining components to form a load bearing joint that comprises:
    an outer, hollow, tubular component having an open end and inner diameter,
    an inner fitting component having a cylindrical shaped portion incorporating a circumferential abutment, an annular locating ring, said cylindrical shaped portion having a landing surface disposed between said circumferential abutment and said annular locating ring, said landing surface deviating no more than approximately 15 degrees from a line parallel to a long axis of said cylindrical shaped portion, said method comprising the steps of:
        a) engaging said annular locating ring of said cylindrical shaped portion of said inner fitting component with and along a predetermined length of said outer, hollow, tubular component, including the steps of:
            i) aligning the cylindrical shaped portion of the inner fitting component and the outer, hollow, tubular component; and
            ii) disposing the cylindrical shaped portion of the inner fitting component into the open end of the outer, hollow tubular component until the outer, hollow, tubular component contacts the circumferential abutment of the inner fitting component; and
        b) progressively intermolecularly bonding the outer, hollow, tubular component to said landing surface of said inner fitting component, said bonding process beginning proximate said circumferential abutment and progressing toward said annular locating ring, with an electromagnetic force.

2. The method of joining components in accordance with claim 1, wherein said engaging step (a) further comprises the step of:
    iii) creating an interference fit between said annular locating ring and said outer tubular component, thereby deforming said outer tubular component.

3. The method of joining components in accordance with claim 1, wherein said engaging step (a) further comprises the step of:
    iii) stress relieving said tubular component by fabricating a lead chamfer upon said annular locating ring with a stress relief radius.

4. The method of joining components in accordance with claim 1, wherein said tubular component and the fitting component comprise different materials, respectively.

5. The method of joining components in accordance with claim 4, wherein said tubular component comprises aluminum alloy.

6. The method of joining components in accordance with claim 4, wherein said fitting component comprises steel.

7. The method of joining components in accordance with claim 1, wherein said welding step (b) further comprises the steps of placing an induction coil over the engaged inner fitting and outer tubular components and pulse charging said induction coil to create an electromagnetic force.

8. A load bearing joint assembly, comprising:
    an outer, hollow, tubular component having an open end and an inner wall; and an inner fitting component having a cylindrical shaped portion incorporating a circumferential abutment, an annular locating ring and a tapered landing surface disposed therebetween, said annular locating ring of said cylindrical shaped portion of the inner fitting component being engaged with said inner wall of said outer tubular component, said cylindrical shaped portion of said inner fitting component being aligned with said outer tubular component, said open end of said outer tubular component being in contact with said circumferential abutment of said inner fitting component, and said outer tubular component comprises a progressive electromagnetically formed weld over said inner fitting component at a non-perpendicular angle to a surface thereof, said electromagnetically formed weld beginning at a point on said landing surface adjacent said circumferential abutment and progressing toward said annular locating ring.

9. The load bearing joint assembly in accordance with claim 4, wherein an interference fit occurs between said inner fitting component and said outer tubular component assembly prior to welding.

10. The load bearing joint assembly in accordance with claim 8, wherein said inner fitting component further comprises a lead chamfer with a stress relieving surface disposed thereupon.

11. The load bearing joint assembly in accordance with claim 10, wherein said stress relieving surface further has a radius that intersects said landing surface.

12. The load bearing joint assembly in accordance with claim 8, wherein said tubular component and said fitting component comprise different materials, respectively.

13. The load bearing joint assembly in accordance with claim 12, wherein said tubular component comprises aluminum alloy.

14. The load bearing joint assembly in accordance with claim 12, wherein said fitting component comprises steel.

* * * * *